US012636627B2

(12) United States Patent
Akabane et al.

(10) Patent No.: US 12,636,627 B2
(45) Date of Patent: May 26, 2026

(54) METHOD FOR CONTROLLING MIXER AND METHOD FOR PRODUCING CARRIER

(71) Applicant: FUJIFILM Business Innovation Corp., Tokyo (JP)

(72) Inventors: Yosuke Akabane, Kanagawa (JP); Takeshi Tanabe, Kanagawa (JP); Atsushi Yamahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 753 days.

(21) Appl. No.: 17/940,621

(22) Filed: Sep. 8, 2022

(65) Prior Publication Data

US 2023/0285915 A1 Sep. 14, 2023

(51) Int. Cl.

| | |
|---|---|
| ***B01F 35/00*** | (2022.01) |
| ***B01F 27/113*** | (2022.01) |
| ***B01F 35/22*** | (2022.01) |
| ***B01F 35/221*** | (2022.01) |
| ***B01F 35/222*** | (2022.01) |
| *B01F 101/56* | (2022.01) |

(52) U.S. Cl.

CPC ........ *B01F 35/2202* (2022.01); *B01F 27/113* (2022.01); *B01F 35/2213* (2022.01); *B01F 35/222* (2022.01); *B01F 2101/56* (2022.01)

(58) Field of Classification Search

CPC .............. B01F 35/2202; B01F 35/2213; B01F 2101/56; B01F 35/222

See application file for complete search history.

(56) References Cited

FOREIGN PATENT DOCUMENTS

| | | | |
|---|---|---|---|
| JP | 2003-107800 | A | 4/2003 |
| JP | 2011-118987 | A | 6/2011 |
| JP | 5618789 | B2 | 11/2014 |

OTHER PUBLICATIONS

Earth Technica KK JP5618789B2 provided in the IDS mailed Aug. 8, 2022, a machine translation is provided (Year: 2014).*
Communication dated Oct. 28, 2025 in Japanese Application No. 2022-037456.

* cited by examiner

*Primary Examiner* — Anshu Bhatia
(74) *Attorney, Agent, or Firm* — Sughrue Mion, PLLC

(57) ABSTRACT

A method, for controlling a mixer that mixes materials through rotation of an impeller while a solvent contained in the materials is evaporated under negative pressure, performs a process in which the mixer is operated while the pressure inside the mixer is increased or decreased according to a predetermined profile. When a power value of the impeller exceeds a predetermined upper limit during the operation of the mixer, the pressure inside the mixer is increased. When the power value falls below a predetermined lower limit during the operation of the mixer, the pressure inside the mixer is decreased.

8 Claims, 6 Drawing Sheets

FIG. 7

| | | | Example 1 | Example 2 | Example 3 | Example 4 | Example 5 | Example 6 | | Comparative Example 1 | Comparative Example 2 | Comparative Example 3 |
|---|---|---|---|---|---|---|---|---|---|---|---|---|
| Conditions | Pressure profile | Pattern | 100 | 100 | 100 | **200** | 100 | 100 | | 300 | 100 | 100 |
| | Upper power limit (rated power ratio) | % | 100 | **80** | 100 | 100 | 100 | 100 | | - | **70** | 100 |
| | Lower power limit (power ratio relative to 25% of rated power ratio) | % | 200 | 200 | **110** | 200 | 200 | 200 | | - | 200 | **300** |
| | Target power value (rated power ratio) | % | - | - | - | - | - | - | | 80 | - | - |
| | Mask time | sec | 30 | 30 | 30 | 30 | **60** | **0** | | - | 30 | 30 |
| | Number of revolutions of impellor | rpm | 60 | 60 | 60 | 60 | 60 | 60 | | 60 | 60 | 60 |
| Results | Time required for second step | min | 41 | 56 | 45 | 33 | 43 | 50 | | 43 | 75 | 45 |
| | Maximum load current value (rated power ratio) | % | 112 | 88 | 115 | 109 | 128 | 102 | | 180 | 78 | 135 |
| | Amount of chipping and cracking of carrier | ppm | 0 | 0 | 0 | 0 | 0 | 0 | | 85 | 56 | 62 |
| | Wear rate of blades | mm/ton | 0.01 | 0.02 | 0.02 | 0.02 | 0.02 | 0.01 | | 1.2 | 0.03 | 0.04 |
| | Remarks | | | | | | | | | | | Since the pressure is reduced with the lower power limit being high, an overload occurs after the pressure reduction. |

METHOD FOR CONTROLLING MIXER AND METHOD FOR PRODUCING CARRIER

CROSS-REFERENCE TO RELATED APPLICATIONS

This application is based on and claims priority under 35 USC 119 from Japanese Patent Application No. 2022-037456 filed Mar. 10, 2022.

BACKGROUND

(i) Technical Field

The present disclosure relates to a method for controlling a mixer and a method for producing a carrier.

(ii) Related Art

Japanese Unexamined Patent Application Publication No. 2003-107800 discloses a kneader including a paddle shaft serving as a rotation shaft and kneading disks disposed on the paddle shaft in order to melt-knead a toner material. To maintain power consumption for the rotation of the paddle shaft within a reference range, the kneader further includes means for adjusting at least one of the kneading temperature and the number of revolutions of the kneading shaft.

Japanese Unexamined Patent Application Publication No. 2011-118987 discloses a method for producing a magnetic paint for a magnetic recording medium obtained by coating a non-magnetic support with the magnetic paint. The production method includes the step of kneading magnetic paint raw materials including a magnetic powder, a binder, and an organic solvent using a pressure kneader and then diluting the kneaded product with a resin solution and/or a solvent. In this production method, the value of load current of blades of the pressure kneader is used as the measure of shearing force. When the load current value decreases at a constant rate from the start of kneading until the end of dilution at which the concentration of solids reaches a preset concentration, uniform dilution is considered to be achieved, and the reference value for the load current value of the blades of the pressure kneader during the diluting step is set accordingly. The load current value is continuously detected during the diluting step, and the kneaded product is diluted while the load current value of the blades adjusted to be close to the reference value.

Japanese Patent No. 5618789 discloses a high-speed agitating vacuum dryer that includes an agitation tank equipped with a jacket and agitation impellers. The agitation tank is evacuated by a vacuum pump to dry an object to be treated. The vacuum dryer further includes a pipe that supplies a gas to the agitation tank and an adjusting mechanism for adjusting the flow rate of the gas to be supplied to the agitation tank. The internal pressure of the agitation tank is adjusted to a pressure higher by a prescribed value than the saturated vapor pressure corresponding to the temperature of the object to be treated by introducing the gas with the adjusted flow rate into the agitation tank.

SUMMARY

One known mixer mixes materials through rotation of an impeller while a solvent contained in the materials is evaporated under negative pressure and is operated while the pressure inside the mixer is increased or decreased according to a predetermined profile. When the power value of the impeller of the mixer exceeds a target power value during the operation of the mixer, the pressure inside the mixer is increased. When the power value falls below the target power value, the pressure inside the mixer is decreased. In this case, the frequency of changes in the pressure inside the mixer is high, and the changes in the pressure inside the mixer are large. Therefore, changes in the load power of the impeller are also large.

Aspects of non-limiting embodiments of the present disclosure relate to a method for controlling a mixer that mixes materials through rotation of an impeller while a solvent contained in the materials is evaporated under negative pressure and is operated while the pressure inside the mixer is increased or decreased according to a predetermined profile. With this method, changes in the load power of the impeller of the mixer are smaller than those when the pressure inside the mixer is increased if the power value of the impeller exceeds a target power value during the operation and when the pressure inside the mixer is decreased if the power value falls below the target power value.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for controlling a mixer that mixes materials through rotation of an impeller while a solvent contained in the materials is evaporated under negative pressure, the method performing a process in which the mixer is operated while the pressure inside the mixer is increased or decreased according to a predetermined profile, wherein, when a power value of the impeller exceeds a predetermined upper limit during the operation of the mixer, the pressure inside the mixer is increased, and wherein, when the power value falls below a predetermined lower limit during the operation, the pressure inside the mixer is decreased.

BRIEF DESCRIPTION OF THE DRAWINGS

An exemplary embodiment of the present disclosure will be described in detail based on the following figures, wherein:

FIG. 7 is a table showing the results of evaluation.

DETAILED DESCRIPTION

An exemplary embodiment of the present disclosure will next be described with reference to the drawings.

<Mixing Apparatus 10>

A mixing apparatus 10 includes a mixing impeller. No particular limitation is imposed on the mixing apparatus 10, so long as it is "capable of agitating, heating, and cooling a material in the apparatus," "capable of measuring the temperature of the material in the apparatus, the pressure inside the apparatus, and the load power value of the mixing impeller," and "capable of increasing and decreasing the pressure inside the apparatus," and any known mixing apparatus can be used.

The mixing apparatus used in the present exemplary embodiment is preferably a batch-type mixing apparatus and more preferably a batch-type vacuum mixing apparatus.

Moreover, the batch-type mixing apparatus is preferably a blade-type kneading device, and the direction of the rotation axis of the blades may be a vertical direction or a horizontal direction. In particular, a kneader is more preferred, and a twin-screw horizontal kneader is particularly preferred.

The mixing apparatus has a temperature adjusting structure capable of heating and cooling the inside of the mixing chamber under reduced pressure and a mechanism capable of detecting the load power value of the mixing impeller.

No particular limitation is imposed on the temperature adjusting structure, but the temperature adjusting structure may be a jacket structure.

Figure 1:
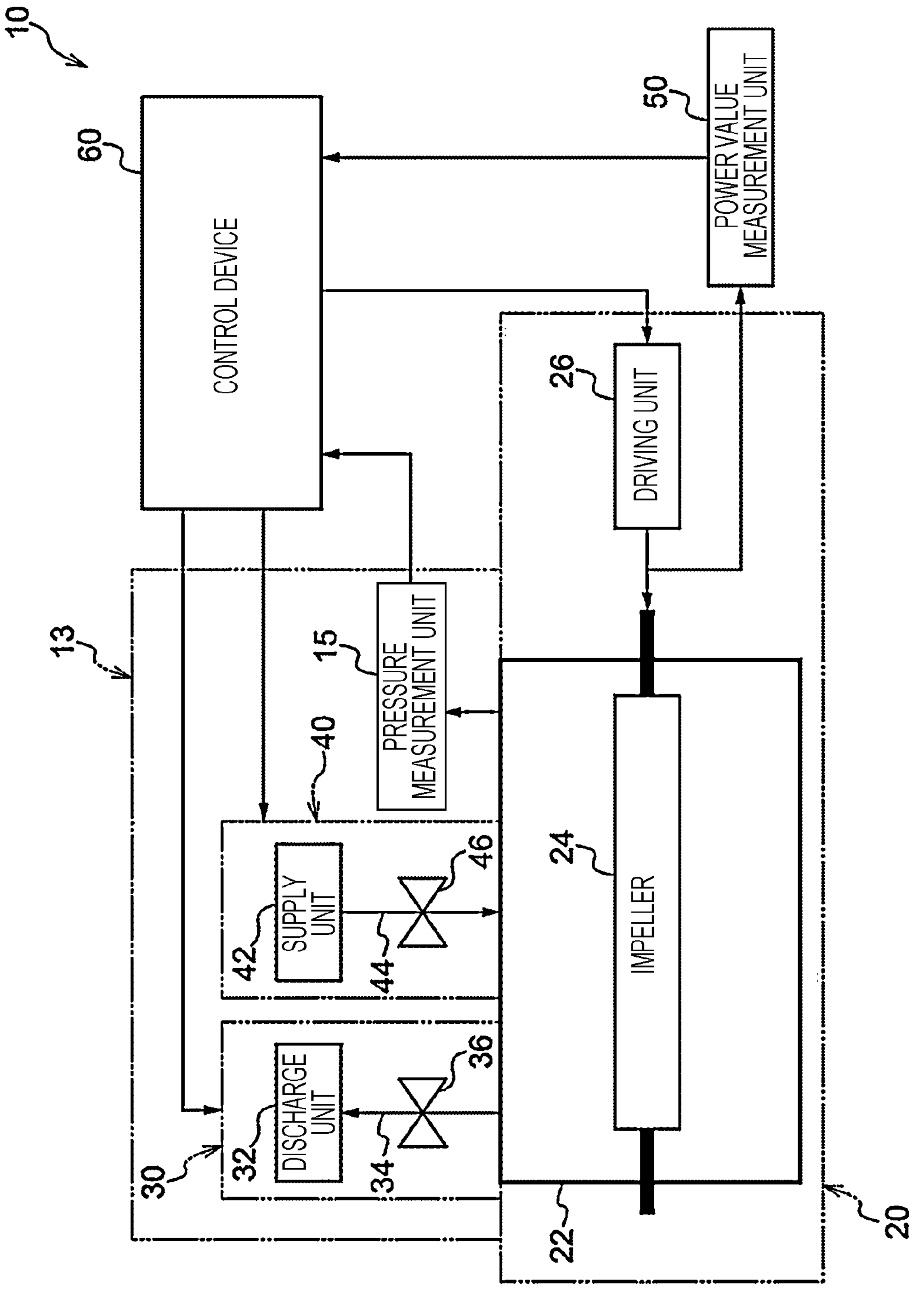
FIG. 1 is a block diagram schematically showing the structure of a mixing apparatus in an exemplary embodiment.

An example of the specific structure of the mixing apparatus 10 will next be described. FIG. 1 is a block diagram schematically showing the structure of the mixing apparatus 10 in the present exemplary embodiment.

The mixing apparatus 10 shown in FIG. 1 is an apparatus for mixing materials (hereinafter referred to as to-be-mixed materials). Specifically, as shown in FIG. 1, the mixing apparatus 10 includes a mixer 20, a pressure adjusting mechanism 30, a power value measurement unit 50, and a control device 60. The to-be-mixed materials and the components of the mixing apparatus 10 will be described.

<To-be-Mixed Materials>

The to-be-mixed materials include a plurality of materials to be mixed in the mixing apparatus 10. Among the to-be-mixed materials, at least one to-be-mixed material contains a solvent. Specifically, in the present exemplary embodiment, the to-be-mixed materials include, as materials to be mixed, magnetic particles and a solution containing a resin and a solvent.

The magnetic particles and the solution are raw materials of a carrier for electrostatic image development (hereinafter referred to simply as a "carrier") containing the magnetic particles and the resin covering the magnetic particles. The resin contained in the solution is the resin covering the magnetic particles in the carrier.

No particular limitation is imposed on the magnetic particles, and known magnetic particles used as a core material for carriers can be used. Specific examples of the magnetic particles include: magnetic metal particles such as iron particles, nickel particles, and cobalt particles; magnetic oxide particles such as ferrite particles and magnetite particles; resin-impregnated magnetic particles prepared by impregnating a porous magnetic powder with a resin; and magnetic powder-dispersed resin particles prepared by dispersing a magnetic powder in a resin.

Examples of the resin covering the magnetic particles include: styrene-acrylic acid copolymers; polyolefin resins such as polyethylene and polypropylene; polyvinyl and polyvinylidene resins such as polystyrene, acrylic resins, polyacrylonitrile, polyvinyl acetate, polyvinyl alcohol, polyvinyl butyral, polyvinyl chloride, polyvinylcarbazole, polyvinyl ether, and polyvinyl ketone; vinyl chloride-vinyl acetate copolymers; straight silicone resins having organosiloxane bonds and modified products thereof; fluorocarbon resins such as polytetrafluoroethylene, polyvinyl fluoride, polyvinylidene fluoride, and polychlorotrifluoroethylene; polyesters; polyurethanes; polycarbonates; amino resins such as urea-formaldehyde resins; and epoxy resins.

The content of the resin included in the resin layer may be from 50% by mass to 100% by mass inclusive based on the total mass of the resin layer. The resin layer may further contain an internal additive.

The internal additive is a component included in the resin layer and other than the above-describe resin in the resin layer.

Examples of the internal additive include electrically conductive materials and inorganic and resin particles other than the electrically conductive materials.

In the present exemplary embodiment, the magnetic particles and the solution containing the resin and the solvent have been exemplified as the to-be-mixed materials, but the to-be-mixed materials are not limited to these materials. Any to-be-mixed material containing a solvent may be used.

<Mixer 20>

The mixer 20 is a structural unit that mixes the to-be-mixed materials through the rotation of an impeller 24 while the solvent contained in the to-be-mixed materials is evaporated under negative pressure. The term "under negative pressure" means that the pressure is lower than atmospheric pressure. The reason that the to-be-mixed materials are mixed under negative pressure in the mixer 20 is to increase the evaporation rate of the solvent. The mixer 20 mixes the to-be-mixed materials in a batch process.

Specifically, the mixer 20 includes a container 22, the impeller 24 used as mixing blades, and a driving unit 26. The container 22 is a container unit that contains the to-be-mixed materials. The impeller 24 is rotatably supported in the container 22 and rotated to agitate the to-be-mixed materials contained in the container 22. The driving unit 26 has the function of rotationally driving the impeller 24 and includes a driving source such as a motor.

<Pressure Adjusting Mechanism 13>

The pressure adjusting mechanism 13 adjusts the pressure inside the mixer 20 (i.e., the internal pressure of the container 22). Specifically, the pressure adjusting mechanism 13 includes a pressure reducing mechanism 30, a pressure increasing mechanism 40, and a pressure measurement unit 15.

The pressure reducing mechanism 30 is a mechanism for reducing the internal pressure of the container 22. Specifically, the pressure reducing mechanism 30 includes a discharge unit 32, a connection pipe 34, and a valve 36. The discharge unit 32 is connected to the container 22 through the connection pipe 34. The discharge unit 32 has the function of discharging gas inside the container 22. Specifically, for example, the discharge unit 32 is configured to include a vacuum pump that sucks the gas inside the container 22. The valve 36 is disposed in the connection pipe 34. A filter (not shown) for removing foreign substances contained in the sucked air may be disposed in the connection pipe 34.

The discharge unit 32 in the pressure reducing mechanism 30 discharges the gas inside the container 22, and the internal pressure of the container 22 is thereby decreased. Moreover, by adjusting the opening of the valve 36 in the pressure reducing mechanism 30, the amount of the gas discharged from the inside of the container 22 (i.e., the amount of reduction in the pressure inside the mixer) is adjusted.

The pressure increasing mechanism 40 is a mechanism for increasing the internal pressure of the container 22. Specifically, the pressure increasing mechanism 40 includes a supply unit 42, a connection pipe 44, and a valve 46. The supply unit 42 is connected to the container 22 through the connection pipe 44. The supply unit 42 has the function of supplying gas to the inside of the container 22. Specifically, the supply unit 42 is configured to include a pump that supplies the gas to the inside of the container 22. The valve 46 is disposed in the connection pipe 44.

The supply unit 42 in the pressure increasing mechanism 40 supplies the gas to the inside of the container 22 to increase the internal pressure of the container 22. Moreover, by adjusting the opening of the valve 46 in the pressure increasing mechanism 40, the amount of the gas supplied to the inside of the container 22 (i.e., the amount of increase in the pressure inside the mixer) is adjusted. The gas supplied by the supply unit 42 is, for example, nitrogen.

The pressure measurement unit 15 measures the pressure inside the mixer 20. Specifically, the pressure measurement unit 15 includes a manometer that measures the internal pressure of the container 22. The data about the measurement results measured by the pressure measurement unit 15 is sent to the control device 60.

<Power Value Measurement Unit 50>

The power value measurement unit 50 measures the power value (specifically the load power value) of the impeller 24. Specifically, the power value is determined using the value of a load current for driving the impeller 24 by the driving unit 26. The data about the measurement results measured by the power value measurement unit 50 is sent to the control device 60.

The power value of the impeller 24 gradually increases as the viscosity of the to-be-mixed materials increases due to evaporation (i.e., drying) of the solvent contained in the to-be-mixed materials. Then, as the evaporation of the solvent in the to-be-mixed materials (i.e., the drying of the to-be-mixed materials) approaches its end, the power value of the impeller 24 decreases sharply.

<Control Device 60>

Figure 2:
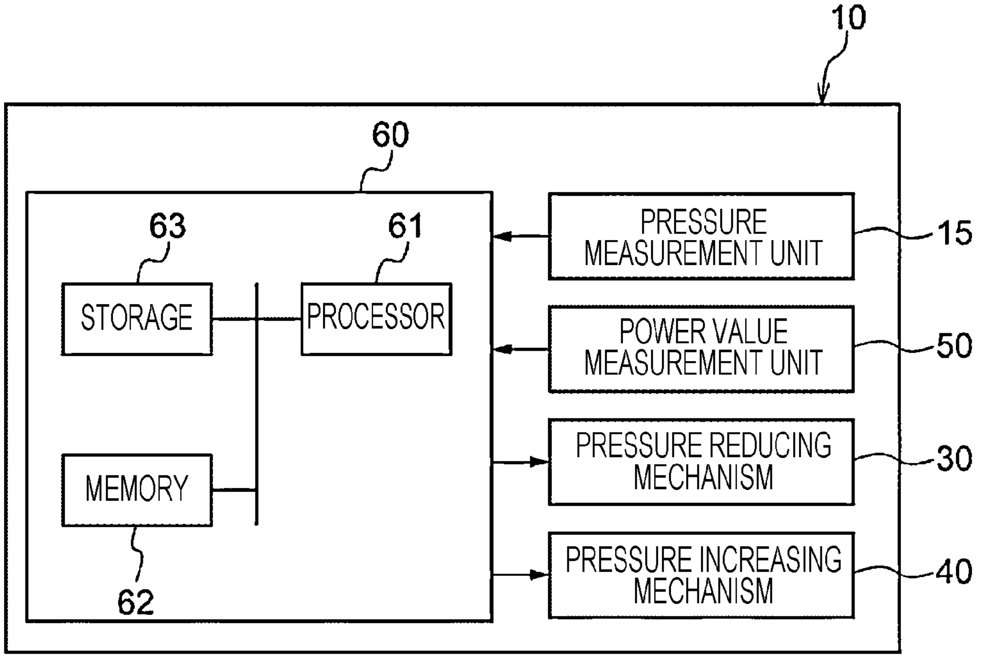
FIG. 2 is a block diagram showing an example of a control device in the mixing apparatus in the present exemplary embodiment.

The control device 60 controls the operations of the components of the mixing apparatus 10 and is an example of a controller. Specifically, as shown in FIG. 2, the control device 60 includes a processor 61, a memory 62, and a storage 63. The processor 61 may be regarded as an example of the controller.

The processor 61 used is, for example, a CPU (Central Processing Unit) that is a general purpose processor. The storage 63 stores various programs including a control program 63A (see FIG. 3) and various types of data. Specifically, the storage 63 is implemented using a storage device such as an HDD (Hard Disk Drive), an SSD (Solid State Drive), or a flash memory.

The memory 62 is a working area used by the processor 61 to execute various programs and temporarily stores various programs and various types of data when the processor 61 performs processing. The processor 61 reads various programs including the control program 63A from the storage 63, stores them in the memory 62, and executes the programs with the memory 62 used as the working area.

Figure 3:
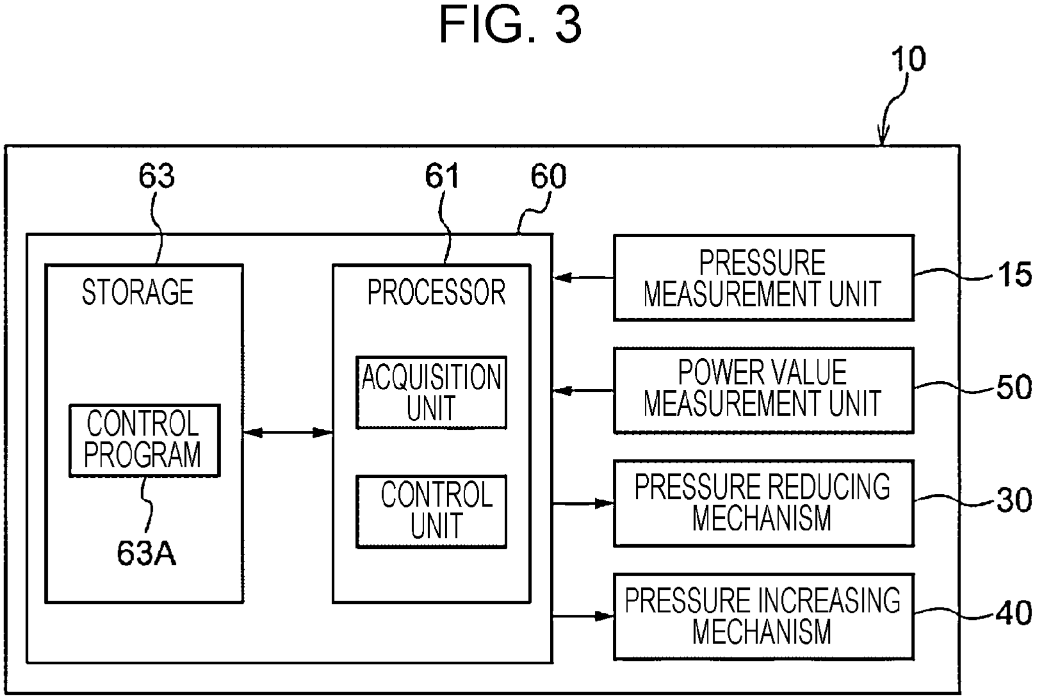
FIG. 3 is a block diagram showing an example of the functional configuration of a processor in the control device in the mixing apparatus in the present exemplary embodiment.

In the control device 60, the processor 61 executes the control program 63A to implement various functions. A functional configuration implemented by cooperation of the processor 61 serving as a hardware resource and the control program 63A serving as a software resource will next be described. FIG. 3 is a block diagram showing the functional configuration of the processor 61.

As shown in FIG. 3, in the control device 60, the processor 61 executes the control program 63A and thereby functions as an acquisition unit 61A and a control unit 61B.

The acquisition unit 61A acquires information about the pressure inside the mixer 20 (hereinafter referred to as pressure information). The acquisition unit 61A also acquires information about the power value of the impeller 24 (hereinafter referred to as power value information).

The control unit 61B is a functional unit that controls the operation of the mixer 20. The control unit 61B controls the pressure inside the mixer 20 on the basis of at least the pressure information and the power value information acquired by the acquisition unit 61A. Specifically, the control unit 61B controls the mixer 20 using the following method for controlling the mixer 20.

<Method for Controlling Mixer 20>

The control unit 61B performs a process in which the mixer 20 is operated while the pressure inside the mixer 20 is increased or decreased according to a predetermined profile (hereinafter referred to as a pressure profile 100). When the power value of the impeller 24 exceeds a predetermined upper limit (hereinafter referred to as an upper power limit) during the operation, the pressure inside the mixer 20 is increased. When the power value of the impeller 24 falls below a predetermined lower value (hereinafter referred to as a lower power limit) during the operation, the pressure inside the mixer 20 is decreased.

Figure 4:
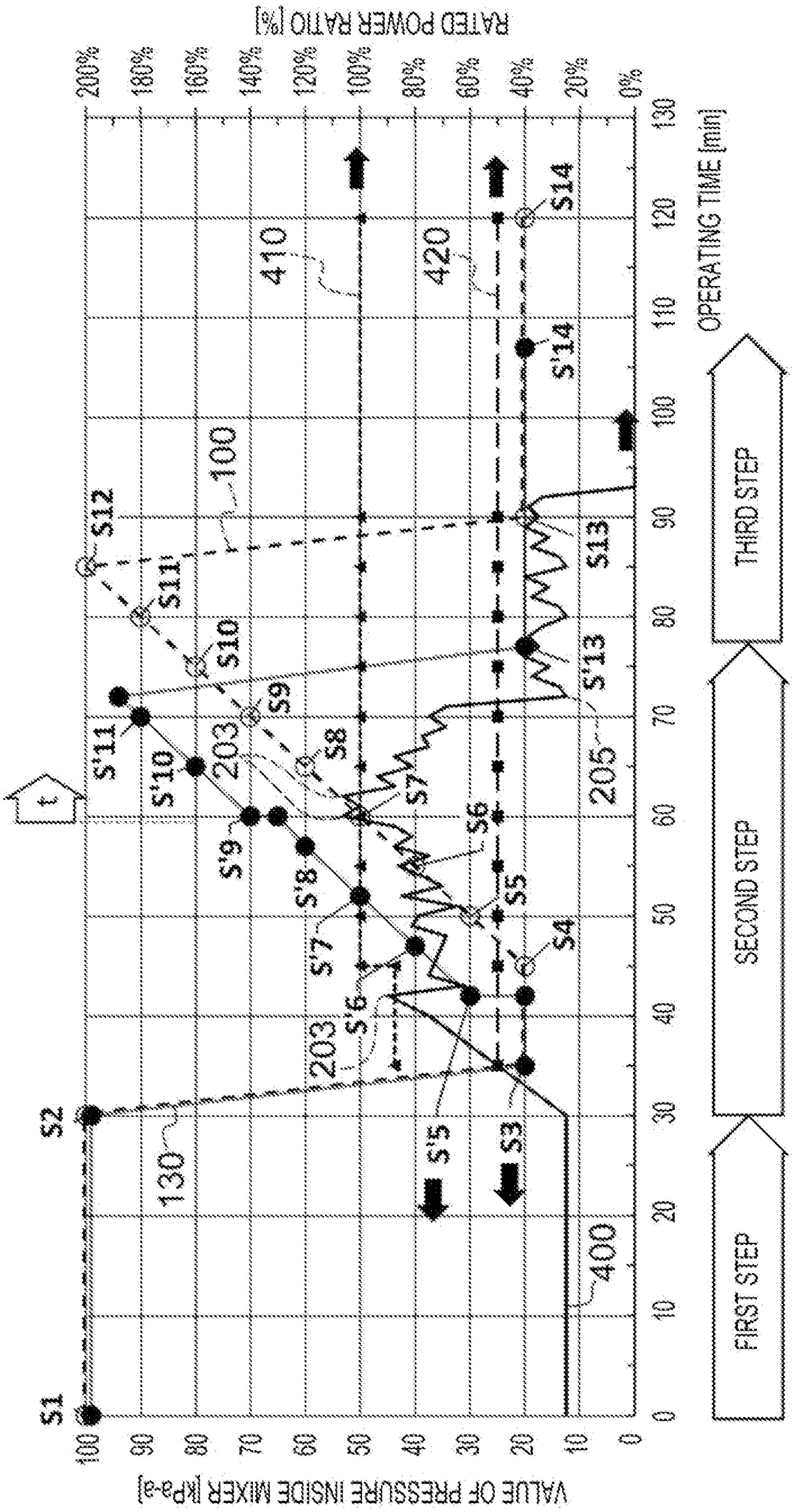
FIG. 4 is a chart showing a pressure profile in the mixing apparatus in the present exemplary embodiment.

The pressure profile 100 (see FIG. 4) includes target values of the pressure inside the mixer 20 (hereinafter referred to as target pressure values) that are arranged in chronological order and shows changes in the target values with time. The pressure profile 100 includes a plurality of sections (see FIG. 4), in each of which the target value of the pressure inside the mixer 20, the upper power limit, and the lower power limit are set. In FIG. 4, an example of the pressure profile 100 is shown by a broken line 100. In FIG. 4, an example of the plurality of sections in the pressure profile 100 is shown by sections between S1 to S14. S1 to S13 correspond to the start points of the sections. In FIG. 4, an example of an actual value of the pressure inside the mixer is shown by a solid line 130.

In the pressure profile 100, execution time, the setting of the number of revolutions of the impeller 24, and the jacket supply temperature of the mixer 20 have been set for each section. In each section, the impeller 24 is rotationally driven based on the corresponding setting of the number of revolutions. In each section, the mixing operation is performed for the corresponding preset execution time, and then the process advances to a subsequent section. The settings of the number of revolutions of the impeller 24, the settings of the jacket supply temperature of the mixer 20, and the settings of the execution time in different sections may be the same or different. In the present exemplary embodiment, the pressure profile 100 and data (information) set for each section such as the target value of the pressure inside the mixer 20, the upper power limit, the lower power limit, the execution time, and the setting of the number of revolutions of the impeller have been stored in the storage 63.

In the pressure profile 100, the target pressure value is maintained at atmospheric pressure (specifically, for example, 100 kPa) for a predetermined period (see S1 to S2) and then decreased (see S2 to S3). Then the target pressure value in the pressure profile 100 is maintained at the lowest value for a predetermined period (see S3 to S4) and gradually increased (see S4 to S12). Then the target pressure value in the pressure profile 100 is decreased (see S12 to S13) and maintained at the lowest value for a predetermined period (see S13 to S14).

The reason that the target pressure value in the pressure profile 100 (see S2 to S14) is set to a negative pressure lower than the atmospheric pressure is to increase the evaporation rate of the solvent. The reason that the target pressure value is gradually increased in the period from S4 to S12 is to slow down the evaporation rate of the solvent.

In FIG. 4, an example of the upper power limit is shown by a broken line 410, and an example of the lower power limit is shown by a broken line 420. The same upper power limit and the same lower power limit may be set for all the sections, or different upper power limits and different lower power limits may be set for different sections. In the example shown in FIG. 4, the upper power limits are the same for a plurality of sections from S4 to S14 and are constant in the plurality of sections from S4 to S14. In a section from S3 to S4, the upper power limit is set to be lower than that in the sections from S4 to S14. The lower power limits are the same for a plurality of sections from S3 to S14 and are constant in the plurality of sections from S3 to S14.

In FIG. 4, an example of an actual value of the power of the impeller 24 is shown by a solid line 400. Points at which the actual value 400 exceeds the upper power limit are indicated by broken lines 203, and the point at which the actual value 400 falls below the lower power limit is indicated by a broken line 205.

As shown in FIG. 4, in S4 to S12 in the pressure profile 100, the target pressure value is set so as to increase as the process advances. Specifically, the pressure profile 100 includes a first region in which the target pressure value increase as the process advances (see S4 to S12) and a second region which is located after the first region and in which the target pressure value decreases (see S12 to S14). In the present exemplary embodiment, the period from S4 to S12 in FIG. 4 corresponds to the first region, and the period from S12 to S14 corresponds to the second region. In FIG. 4, the period from S1 to S3 before the first region corresponds to a setting region in which the target pressure value is maintained at atmospheric pressure (specifically, for example, 100 kPa) for a predetermined period and then decreased. In the present exemplary embodiment, the target pressure value is gradually increased in the first region, and a linear profile is formed. In FIG. 4, points after section advancement that correspond to S5 to S14 are denoted by S'5 to S'14, respectively.

The vertical axis of FIG. 4 represents the value of the pressure inside the mixer for the pressure profile 100 and the actual value 130 of the pressure inside the mixer and also represents the actual value 400 of the power of the impeller 24, the upper power limit 410, and the lower power limit 420 (these power values are specifically ratios relative to the rated power value (rated power ratios)). These values increase toward the upper side of the vertical axis in the drawing sheet. The horizontal axis of FIG. 4 represents the operating time, and the time increases toward the right side of the horizontal axis in the drawing sheet.

The upper power limit is a value that is 80% or more of the rated current value (rated power value) of the impeller 24. The lower power limit is a value that is equal to or more than 110% and equal to or less than 250% of the load current value under atmospheric pressure. The load current value under atmospheric pressure is the load current value (load power value) when the pressure inside the container 22 is atmospheric pressure.

Specifically, in the present exemplary embodiment, the control unit 61B operates the mixer 20 while the pressure inside the mixer 20 is increased or decreased according to the target pressure values for the sections. More specifically, the control unit 61B operates the mixer 20 while feedback control such as PID control is performed such that a measured value in the pressure information agrees with a target value. When the power value of the impeller 24 in a certain section (e.g., the section from S3 to S4) exceeds the upper limit for this section (which may be hereinafter referred to as section A) during the operation, the control unit 61B causes the process to advance to a subsequent section (e.g., S5) in which the target pressure value is higher than that set in the section A to thereby increase the pressure inside the mixer 20. The subsequent section means any section subsequent to the section A (i.e., any section located temporally after the section A). Example of the subsequent section include the section next to the section A and sections subsequent to the next section.

In the example shown in FIG. 4, during execution of the process from S3 to S4, the power value of the impeller 24 exceeds the upper limit for the section from S3 to S4 (for example, a rated power ratio of 87.5% (e.g., 70 kW)). Therefore, the process advances to the start point S5 of a subsequent section in which the target pressure value set is higher than the target pressure value for the section from S3 to S4 to thereby increase the pressure inside the mixer 20. The subsequent section (the section from S5 to S6) is the second next section of the section from S3 to S4.

In the example shown in FIG. 4, during execution of the process from S'8 to S'9, the power value of the impeller 24 exceeds the upper limit for the section from S8 to S9 (for example, a rated power ratio of 100% (e.g., 80 kW)). Therefore, the process advances to the start point S9 of a subsequent section in which the target pressure value set is higher than the target pressure value for the section from S8 to S9 to thereby increase the pressure inside the mixer 20. This section (the section from S9 to S10) is the next section of the section from S8 to S9.

The increase in pressure in the present exemplary embodiment is an increase in pressure under negative pressure. Therefore, an increase in pressure to atmospheric pressure or higher is excluded from the above increase in pressure.

After advancement to a subsequent section, the control unit 61B causes the process to advance to a second subsequent section in which the target pressure value set is higher than the target pressure value for the subsequent section when the power value of the impeller 24 exceeds the upper limit for the subsequent section after a lapse of a predetermined time. Therefore, even when the power value of the impeller 24 exceeds the upper limit for the subsequent section before a lapse of the predetermined time (which may be hereinafter referred to as mask time), the process does not advance to the second subsequent section. The second subsequent section means any section subsequent to the subsequent section (i.e., any section located temporally after the subsequent section). Examples of the second subsequent section include the section next to the subsequent section and sections subsequent to the section next to the subsequent section.

In the example shown in FIG. 4, after advancement to S9, the power value of the impeller 24 exceeds the upper limit for the section from S9 to S10 before a lapse of mask time t, and, in this case, the process does not advance to a subsequent section. The mask time t is set, for example, within the range of from 30 seconds to 180 seconds inclusive.

As described above, the control unit 61B operates the mixer 20 such that the pressure inside the mixer 20 is increased or decreased according to the target pressure values for the sections. When, during operation in a certain section, the power value of the impeller 24 falls below the lower limit for the certain section, the process advances to a section in a subsequent step in which the target value set is lower than the target value for the certain section to thereby reduce the pressure inside the mixer 20. The section in the subsequent step is a section located temporally after the certain section. In the present exemplary embodiment, the section in the subsequent step is a section in the second region (see S12 to S14).

In the example shown in FIG. 4, during execution of the process from S'11 to S'12, the power value of the impeller 24 falls below the lower limit for the section from S11 to S12 (for example, a rated power ratio of 50% (e.g., 40 kw)). Therefore, the process advances to the start point S13 of a section in a subsequent step in which the target pressure value set is lower than the target pressure value for the section from S11 to S12 to thereby reduce the pressure inside the mixer 20.

<Method for Producing Carrier>

In the present exemplary embodiment, the above-described method for controlling the mixer 20 is used to mix the magnetic particles and a coating solution containing the resin and the solvent serving as the to-be-mixed materials to thereby produce a carrier. Specifically, the carrier production method in the present exemplary embodiment includes: the step of preparing the coating solution; a first step of agitating and mixing ferrite particles and the coating solution; a second step of drying the mixture by evaporating the solvent; a third step of pulverizing and cooling the mixture; and a sieving step of removing a coarse powder by sieving after removal from the mixer 20.

Examples will next be described, but the present disclosure is not limited to these Examples. In the following description, "parts" and "%" are all based on mass, unless otherwise specified.

EXAMPLES

—Step of Preparing Coating Solution—

Cyclohexyl methacrylate/methyl methacrylate copolymer (copolymerization ratio 95 moles:5 moles): 3 parts Toluene: 15 parts Carbon black (average particle diameter: 0.2 μm): 0.2 parts Fine resin particles (melamine-formaldehyde condensation product, EPOSTAR FS manufactured by NIPPON SHOKUBAI Co., Ltd., average particle diameter: 0.2 μm): 0.3 parts The above materials are charged into a sand mill and dispersed for 30 minutes, and a coating solution with a solid content of 17% is thereby obtained.

—First Step—

Ferrite particles (volume average particle diameter: 35 μm): 100 parts

Coating solution: such an amount that the solid content is 3 parts based on 100 parts of the ferrite particles 50 kg of the above components are charged into a batch agitation-type vacuum mixer (50 L kneader manufactured by INOUE MFG., INC., agitation impeller diameter D=0.25 m, the clearance between the casing inner wall and the outer circumference of the agitation impeller/D=3.5%) with jacket temperature increased to 90° C., and the mixture is preheated to 70° C. under agitation and mixing at 60 rpm.

The first step is a step performed in S1 to S2 in the pressure profile 100 in FIG. 4. Moreover, the first step is a step performed in S1 to S2 in a pressure profile 200 in FIG. 5 described later.

—Second Step—

Next, the mixer 20 is operated while the impeller is rotated at 60 rpm and the pressure inside the mixer 20 is increased or decreased according to the pressure profile shown in the present exemplary embodiment. As evaporation of the solvent contained in the to-be-mixed materials proceeds (i.e., as drying of the to-be-mixed materials proceeds), the viscosity of the to-be-mixed materials increases, and the power value of the impeller 24 gradually increases.

The second step is a step performed in S2 to S13 in the pressure profile 100 in FIG. 4. Moreover, the second step is a step performed in S2 to S21 in the pressure profile 200 in FIG. 5 described later.

—Third Step—

When the load power of the mixer 20 decreases and the process advances to the second region in the pressure profile, cold water at 20° C. is injected into the jacket of the mixer 20. The agitation is stopped 45 minutes after the injection, and the mixture is discharged from the mixer 20 to produce a carrier.

The third step is a step performed in S13 to S14 in the pressure profile 100 in FIG. 4. Moreover, the third step is a step performed in S21 to S22 in the pressure profile 200 in FIG. 5 described later.

—Fourth Step—

The carrier removed from the mixer 20 is sieved using a sieve with a mesh of 75 μm to thereby produce a final carrier.

<Operation of Present Exemplary Embodiment>

The operation of the present exemplary embodiment will be described.

As described above, in the present exemplary embodiment, the control device 60 operates the mixer 20 while the pressure inside the mixer 20 is increased or decreased according to the pressure profile 100. As the evaporation of the solvent contained in the to-be-mixed materials proceeds (i.e., the drying of the to-be-mixed materials proceeds) in the second step, the viscosity of the to-be-mixed materials increases, and the power value of the impeller 24 increases gradually.

When the power value of the impeller 24 exceeds the upper power limit during the operation, the control device 60 increases the pressure inside the mixer 20 to slow down the evaporation of the solvent (i.e., the drying of the mixture) to thereby prevent an increase in the power value of the impeller 24.

When the power value of the impeller 24 falls below the lower power limit, the evaporation of the solvent (i.e., the drying of the mixture) is considered to have reached near the end, and the control device 60 decreases the pressure inside the mixer 20 to thereby accelerate and complete the evaporation of the solvent (i.e., the drying of the mixture).

In a mode shown in FIG. 6 (hereinafter referred to as a "first mode"), when the power value of the impeller 24 exceeds the target power value during the operation of the mixer 20, the pressure inside the mixer 20 is increased, and, when the power value of the impeller 24 falls below the target power value during the operation of the mixer 20, the pressure inside the mixer 20 is decreased.

Figure 6:
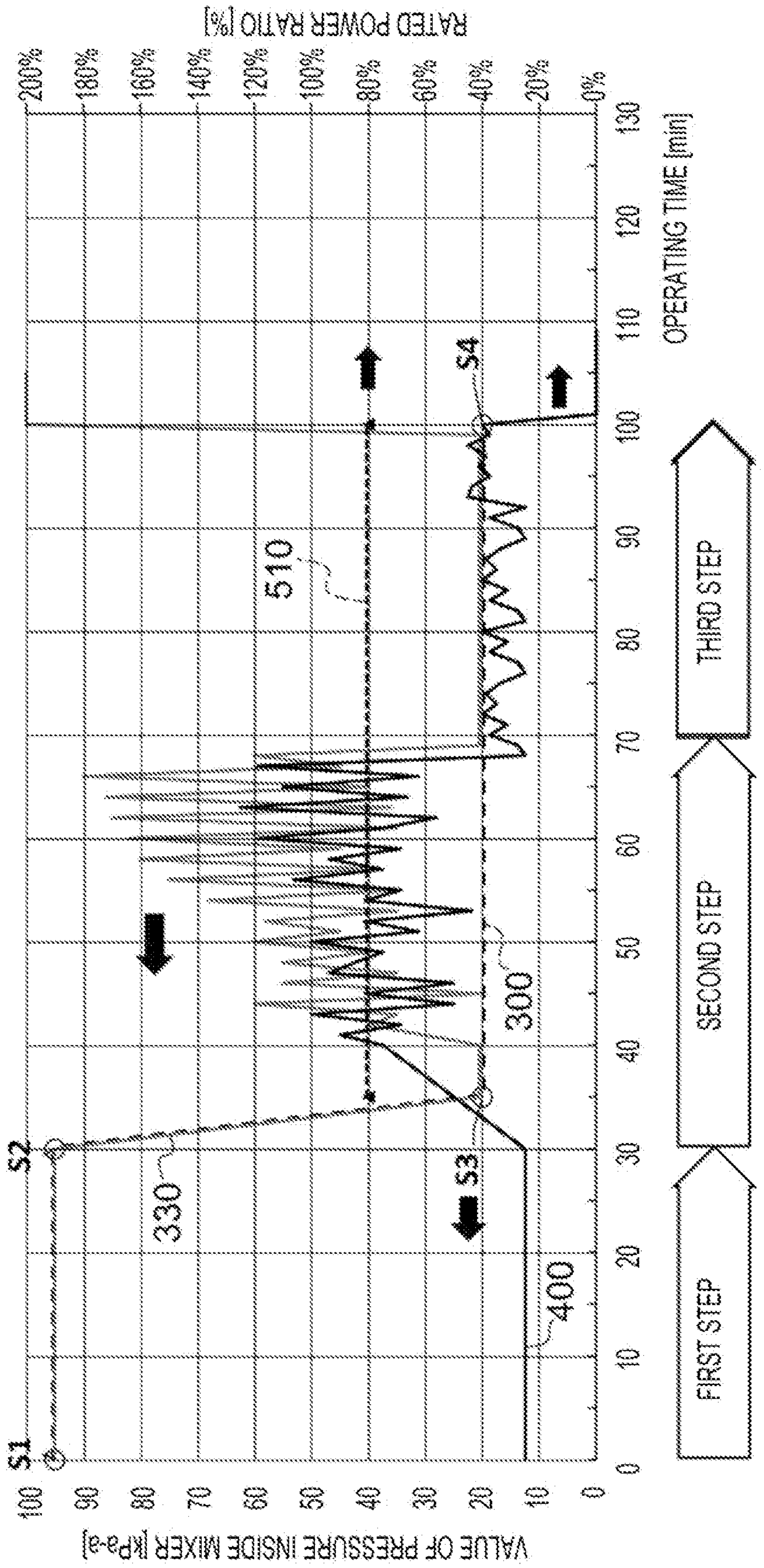
FIG. 6 is a chart showing a pressure profile in a mixing apparatus in a comparative embodiment.

In FIG. 6, an example of a pressure profile 300 including settings of the pressure inside the mixer 20 (hereinafter referred to as pressure settings) that are arranged in chronological order is shown by a broken line 300. In FIG. 6, an example of the actual value of the pressure inside the mixer is shown by a solid line 330. Moreover, in FIG. 6, an example of the target power value is shown by a broken line 510, and an example of the actual value of the power of the impeller 24 is shown by a solid line 400.

As shown in FIG. 6, in the first mode, the pressure inside the mixer 20 is controlled in the period from S3 to S4 such that the power value of the impeller 24 is equal to a target power value 510. Specifically, when the power value of the impeller 24 exceeds the target power value 510, the pressure inside the mixer 20 is increased, and, when the power value of the impeller 24 falls below the target power value 510, the pressure inside the mixer 20 is decreased. Moreover, when the state in which the power value of the impeller 24 is lower than the target power value 510 continues for a predetermined period, the pressure inside the mixer 20 is set to the pressure setting.

The period from S1 to S3 before the period from S3 to S4 corresponds to the setting region in which the target pressure value is maintained at atmospheric pressure (specifically, for example, 100 kPa) for a predetermined period and then decreased.

In the first mode, the pressure inside the mixer 20 is increased or decreased such that the power value of the impeller 24 coincides with one target power value. In this case, the frequency of changes in the pressure inside the mixer is high, and the changes in the pressure inside the mixer are large. Therefore, the changes in the load power of the impeller 24 are also large, and the wear of components such as the impeller 24 is accelerated.

However, in the present exemplary embodiment, when the power value of the impeller 24 exceeds the upper power limit during the operation of the mixer 20, the pressure inside the mixer 20 is increased, and, when the power value of the impeller 24 falls below the lower power limit different from the upper power limit, the pressure inside the mixer 20 is decreased. In this case, the frequency of changes in the pressure inside the mixer is lower than that in the first mode, and changes in the load power of the impeller 24 are smaller than those in the first mode.

<Pressure Profile 200 in Modification>

Figure 5:
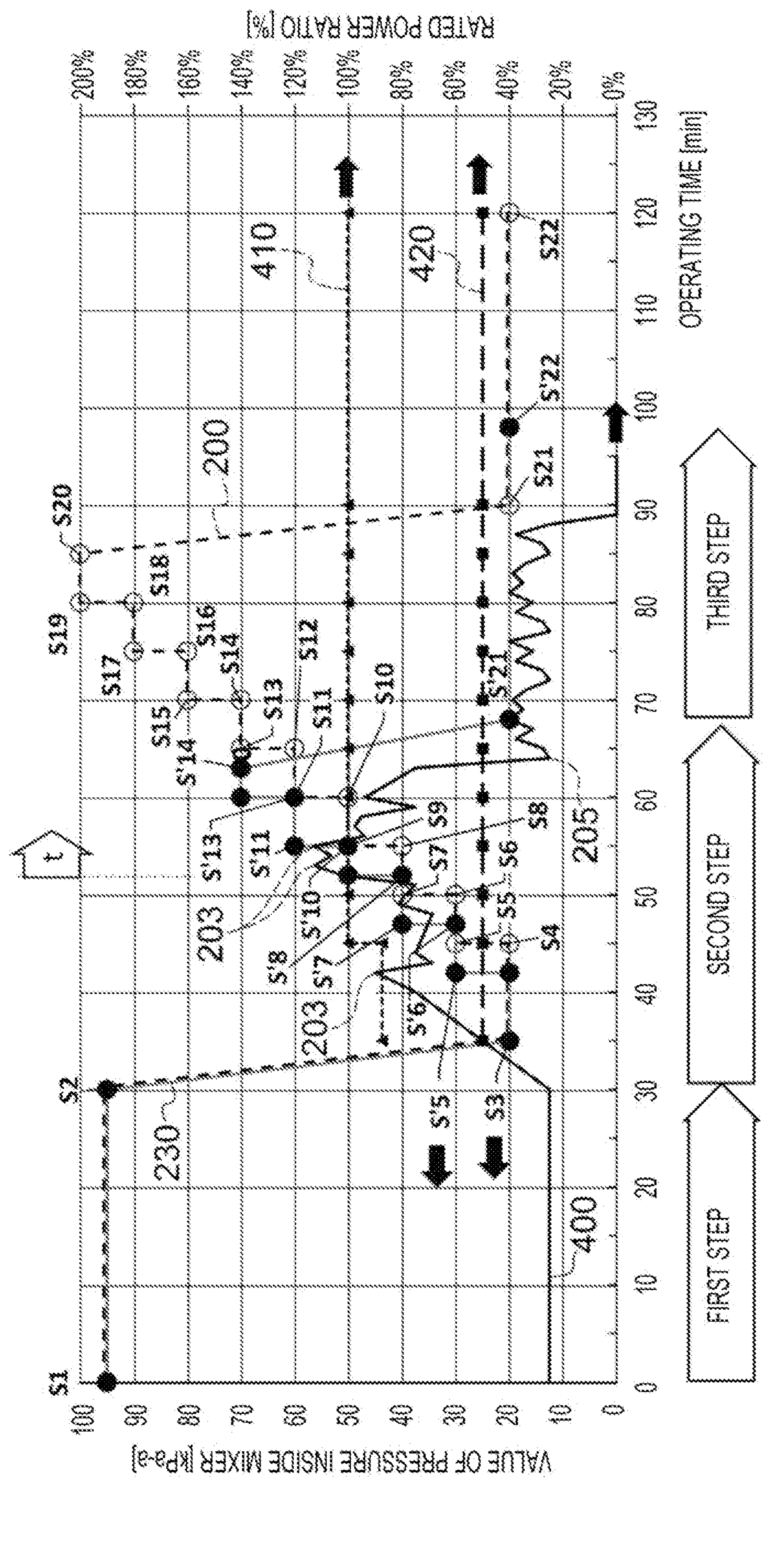
FIG. 5 is a chart showing another example of the pressure profile in the mixing apparatus in the present exemplary embodiment.

The pressure profile in the second step is not limited to the pressure profile 100 shown in FIG. 4, and the pressure profile 200 shown in FIG. 5 may be used. In the pressure profile 200, the target pressure value increases stepwise in the first region (see S3 to S20), and a stepwise profile is formed. In the pressure profile 200, the target value is constant during the execution time in each of the sections from S4 to S12 in the first region. In FIG. 5, an example of the actual value of the pressure inside the mixer is shown by a solid line 230. In the first region of the pressure profile 200, points S3, S5, S7, S9, S11, S13, S15, S17, and S19 correspond to the start points of the sections.

In the example shown in FIG. 5, the power value of the impeller 24 exceeds the upper limit for the section from S3 to S4 (for example, a rated power ratio of 87.5% (e.g., 70 kw)) during execution of the process from S3 to S4. Therefore, the process advances to the start point S5 of a subsequent section in which the target pressure value set is higher than the target pressure value for the section from S3 to S4 to thereby increase the pressure inside the mixer 20. The subsequent section (the section from S5 to S6) is the section next to the section from S3 to S4.

Moreover, in the example shown in FIG. 5, the power value of the impeller 24 exceeds the upper limit for the section from S9 to S10 (for example, a rated power ratio of 100% (e.g., 80 kw)) during execution of the process from S9 to S10. Therefore, the process advances to the start point S11 of a subsequent section in which the target pressure value set is higher than the target pressure value for the section S9 to S10 to thereby increase the pressure inside the mixer 20. The subsequent section (the section from S11 to S12) is the section next to the section from S9 to S10.

In the example shown in FIG. 5, after advancement to S11, the power value of the impeller 24 exceeds the upper limit for the section from S11 to S12 before a lapse of mask time t (for example, in the range of from 30 seconds to 180 seconds inclusive), and, in this case, the process does not advance to a subsequent section.

In FIG. 5, the period from S4 to S20 corresponds to the first region, and the period from S20 to S22 corresponds to the second region. In FIG. 5, the period from S1 to S3 before the first region corresponds to the setting region in which the target pressure value is maintained at atmospheric pressure (specifically, for example, 100 kPa) for a predetermined period and then decreased. In FIG. 5, points after section advancement that correspond to S5 to S22 are denoted by S'5 to S'22, respectively.

The pressure profile is not limited to the pressure profile 100 shown in FIG. 4 and the pressure profile 200 shown in FIG. 5, and profiles having various shapes including curved portions etc. can be used.

Other Modifications

In the present exemplary embodiment, when, during the operation of the mixer 20 in a certain section, the power value of the impeller 24 exceeds the upper limit for the certain section, the process advances to a subsequent section in which the target pressure value set is higher than the target pressure value for the certain section to thereby increase the pressure inside the mixer 20, but this is not a limitation. For example, the pressure inside the mixer may be increased to an increased pressure value set for the certain section without advancement to the subsequent section.

In the present exemplary embodiment, it is unnecessary that the subsequent section to which the process advances be the section next to the previous section. For example, the subsequent section to which the process advances may be a section subsequent to the next section of the previous section.

In the present exemplary embodiment, when, after advancement to a subsequent section, the power value of the impeller 24 exceeds the upper limit of the subsequent section after a lapse of a predetermined time, the process advances to a second subsequent section in which the target value set is higher than the target value for the subsequent section, but this is not a limitation. For example, when, immediately after the advancement to the subsequent section, the power value of the impeller 24 exceeds the upper limit for the subsequent section, the process may advance to the second subsequent section in which the target value set is higher than the target value for the subsequent section with no retention time.

Moreover, when, during the operation of the mixer 20 in a certain section, the power value of the impeller 24 falls below the lower limit for the certain section, the process advances to a section in a subsequent step in which the target value set is lower than the target value for the certain section to thereby reduce the pressure inside the mixer 20, but this is not a limitation. For example, the pressure inside the mixer may be decreased to a reduced pressure value set for the certain section without advancement to the section in the subsequent step.

In the present exemplary embodiment, the upper power limit is equal to or larger than 80% of the rated current value of the impeller 24, and the lower power limit is from 110% to 250% inclusive of the load current value under atmospheric pressure, but this is not a limitation. The upper power limit used may be a value less than 80% of the rated current value of the impeller 24. The lower power limit used may be a value less than 110% of the load current value under atmospheric pressure or a value higher than 250% of the load current value under atmospheric pressure.

In the above exemplary embodiment, the processor means a processor in a broad sense, and examples of the processor include general-purpose processors (such as the CPU described above) and special-purpose processors (such as GPUs: Graphics Processing Units, ASICs: Application Specific Integrated Circuits, FPGAs: Field Programmable Gate Arrays, and programmable logical devices).

The operations of the processor in the above exemplary embodiment may be implemented not only by only one processor but also by a plurality of physically separated processors in a cooperative manner. The order of the operations of the processor is not limited only to that described in the above exemplary embodiment and may be changed appropriately.

<Evaluation>

The above carrier production method is performed under the following conditions for each of Examples 1 to 6 and Comparative Examples 1 to 3 and then evaluated (see FIG. 7). In the present evaluation, cracking and chipping of the carrier, the wear rate of blades, etc. are evaluated for each of the following Examples 1 to 6 and Comparative Examples 1 to 3.

Example 1

Pressure profile: the pressure profile 100 shown in FIG. 4
Upper power limit after S4: 100% of the rated power
Lower power limit: 200%
Mask time: 30 seconds
Number of revolutions of impeller 24: 60 rpm Since the load current value (load power value) under atmospheric pressure is 25% of the rated current value (rated power value), the lower power limit in terms of the power ratio relative to 25% of the rated current value is shown.

Example 2

Pressure profile: the pressure profile 100 shown in FIG. 4
Upper power limit after S4: 80% of the rated power
Lower power limit: 200%
Mask time: 30 seconds
Number of revolutions of impeller 24: 60 rpm

Example 3

Pressure profile: the pressure profile 100 shown in FIG. 4
Upper power limit after S4: 100% of the rated power
Lower power limit: 110%
Mask time: 30 seconds
Number of revolutions of impeller 24: 60 rpm

Example 4

Pressure profile: the pressure profile 200 shown in FIG. 5
Upper power limit after S4: 100% of the rated power
Lower power limit: 200%
Mask time: 30 seconds
Number of revolutions of impeller 24: 60 rpm

Example 5

Pressure profile: the pressure profile 100 shown in FIG. 4
Upper power limit after S4: 100% of the rated power
Lower power limit: 200%
Mask time: 60 seconds
Number of revolutions of impeller 24: 60 rpm

Example 6

Pressure profile: the pressure profile 100 shown in FIG. 4
Upper power limit after S4: 100% of the rated power
Lower power limit: 200%
Mask time: 0 seconds
Number of revolutions of impeller 24: 60 rpm

Comparative Example 1

Pressure profile: the pressure profile 300 shown in FIG. 6
Target power value: 80%
Number of revolutions of impeller 24: 60 rpm

Comparative Example 2

Pressure profile: the pressure profile 100 shown in FIG. 4
Upper power limit after S4: 70% of the rated power
Lower power limit: 200%
Mask time: 30 seconds
Number of revolutions of impeller 24: 60 rpm

Comparative Example 3

Pressure profile: the pressure profile 100 shown in FIG. 4
Upper power limit after S4: 100% of the rated power
Lower power limit: 300%
Mask time: 30 seconds
Number of revolutions of impeller 24: 60 rpm Comparative Examples 2 and 3 are included in modes of the present exemplary embodiment.

<Time Required for Second Step>

The time [min] required for the second step is measured for each of Examples 1 to 6 and Comparative Examples 1 to 3.

In the pressure profile 100 in FIG. 4, the second step is a step performed in S2 to S13. In the pressure profile 200 in FIG. 5, the second step is a step performed in S2 to S21. In the pressure profile 300 in FIG. 6, the second step is a step performed in the period from S3 to S4, started from the state in which the pressure inside the mixer 20 is controlled according to the target power value 510, and continued until the pressure inside the mixer 20 is set to the pressure setting.

<Maximum Load Current Value (Maximum Load Power Value)>

In Examples 1 to 6 and Comparative Examples 1 to 3, a maximum load current value (maximum load power value) is measured. The maximum load current value (maximum load power value) is determined as the rated power ratio [%].

<Evaluation of Chipping and Cracking of Carrier>

The amount of chipping and cracking in the carrier is very small and therefore evaluated as the ratio [% (ppm)] of irregularly shaped particles in particles sieved through a 20 μm sieve.

First, the ratio W [wt %] of fine particles sieved through a 20 μm sieve is computed.

Next, 10 images of the particles sieved through the 20 μm sieve are randomly captured using SEM4100 at 350× and subjected to LUZEX image processing to count the total number of captured particles and the number of irregularly shaped particles, and the mixing ratio of the irregularly shaped particles B [%] is computed by image analysis.

The ratio of the irregularly shaped particles in the particles sieved through the 20 μm sieve [%]=the ratio W [wt %] of the fine particles sieved through the 20 μm sieve×the mixing ratio of the irregularly shaped particles B [%]

The chipped and cracked carrier particles stick to a photoreceptor of a real device and cause image defects. Therefore, the ratio of the irregularly shaped particles is preferably 65 ppm or less and more preferably 50 ppm or less.

<Evaluation of Wear Rate of Blades>

W (ton) of a carrier is subjected to drying treatment. The distance of a position of a blade (of the impeller) of the mixer from a fixed point of the mixer that is not in contact with the carrier is measured before and after the drying treatment. The difference between the distances before and after the treatment is used as wear distance L (mm), and the wear rate (mm/ton)=L/W is used for evaluation. In the measurement, the displacement is measured using, for example, a laser scale.

<Evaluation Results>

As shown in FIG. 7, in Examples 1 to 6, no chipping and cracking occurs in the carrier. In Comparative Examples 2 and 3, chipping and cracking occurs in the carrier, but the amount of chipping and cracking in the carrier (the ratio of irregularly shaped particles) is 65 ppm or less. In Comparative Example 1, chipping and cracking occurs in the carrier, and the amount of chipping and cracking in the carrier (the ratio of irregularly shaped particles) exceeds 65 ppm.

As for the wear rate of blades, the results show that the wear rate increases in the order of Examples 1 and 6, Examples 2 to 5, Comparative Example 2, Comparative Example 3, and Comparative Example 1. Therefore, the results show that the wear of the blades is smaller in Examples 2 to 5 than in Comparative Examples 1 to 3. The results also show that the wear of the blades is smallest in Examples 1 and 6.

The present disclosure is not limited to the above exemplary embodiment and Examples, and various modifications, changes, improvements are possible without departing from the scope of the disclosure. For example, a plurality of the modifications described above may be appropriately combined.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for controlling a mixer, the method comprising:

mixing materials comprising magnetic particles and a solution comprising a resin and a solvent, through rotation of an impeller while the solvent is evaporated under negative pressure, to thereby produce a carrier for electrostatic image development, wherein the mixing comprises performing a process comprising operating the mixer while a pressure inside the mixer is increased or decreased according to a predetermined profile, wherein, when a power value of the impeller exceeds a predetermined upper limit during the operation of the mixer, the pressure inside the mixer is increased, and wherein, when the power value falls below a predetermined lower limit during the operation of the mixer, the pressure inside the mixer is decreased.

2. The method for controlling a mixer according to claim 1, wherein the predetermined profile includes a plurality of sections, in each of which execution time, a target value of the pressure inside the mixer, the upper limit, and the lower limit are set, wherein the mixer is operated while the pressure inside the mixer is changed according to the target values set for the respective sections, and wherein, when, in a certain section, the power value exceeds the upper limit for the certain section, the process advances to a subsequent section in which the target value set is higher than the target value for the certain section to thereby increase the pressure inside the mixer.

3. The method for controlling a mixer according to claim 2, wherein the predetermined profile is set such that the target value of the pressure inside the mixer increases as the process advances.

4. The method for controlling a mixer according to claim 2, wherein, when, after advancement to the subsequent section because the power value has exceeded the upper limit for the certain section, the power value exceeds the upper limit for the subsequent section after a lapse of a predetermined time, the process advances to a second subsequent section in which the target value set is higher than the target value for the subsequent section.

5. The method for controlling a mixer according to claim 1, wherein the predetermined profile includes a plurality of sections, in each of which execution time, a target value of the pressure inside the mixer, the upper limit, and the lower limit are set, wherein the mixer is operated while the pressure inside the mixer is changed according to the target values set for the respective sections, and wherein, when, in a certain section, the power value falls below the lower limit for the certain section, the process advances to a section in a subsequent step in which the target value set is lower than the target value for the certain section to thereby decrease the pressure inside the mixer.

6. The method for controlling a mixer according to claim 5, wherein the predetermined profile includes a first region in which the target value increases as the process advances and a second region which is located after the first region and in which the target value decreases as the process advances, and wherein the section in which the pressure inside the mixer is decreased is a section in the second region.

7. The method for controlling a mixer according to claim 2, wherein, during the execution time in each section, the target value of the pressure inside the mixer is constant.

8. The method for controlling a mixer according to claim 1, wherein the upper limit is a value equal to or 80% or more of a rated current value of the impeller, and wherein the lower limit is a value equal to or more than 110% and equal to or less than 250% of a load current value under atmospheric pressure.

* * * * *